United States Patent [19]
Cochimin

[11] Patent Number: 5,898,245
[45] Date of Patent: Apr. 27, 1999

[54] SELF-LUBRICATING SUBMERSIBLE ELECTRIC MOTOR

[75] Inventor: Jimmy Cochimin, Fort Wayne, Ind.

[73] Assignee: Franklin Electric Company, Inc., Bluffton, Ind.

[21] Appl. No.: 08/874,021

[22] Filed: Jun. 12, 1997

[51] Int. Cl.[6] ................................................. H02K 9/00
[52] U.S. Cl. ................ 310/52; 310/52; 310/58; 310/60 A; 310/61; 310/65; 310/87
[58] Field of Search ............................ 310/52, 58, 60 A, 310/61, 65, 87

[56] References Cited

U.S. PATENT DOCUMENTS

| | | | |
|---|---|---|---|
| 4,377,763 | 3/1983 | Drake ........................................ | 310/87 |
| 4,995,789 | 2/1991 | Fujio ......................................... | 417/360 |
| 5,087,170 | 2/1992 | Kousokabe et al. ..................... | 415/110 |
| 5,169,286 | 12/1992 | Yamada ..................................... | 415/48 |
| 5,212,964 | 5/1993 | Utter et al. ................................ | 62/498 |
| 5,616,973 | 4/1997 | Khazanov et al. ........................ | 310/54 |
| 5,674,056 | 10/1997 | Yamamoto et al. ..................... | 417/366 |
| 5,704,717 | 1/1998 | Cochimin ................................. | 384/215 |

Primary Examiner—Elvin G. Enad
Attorney, Agent, or Firm—Marshall, O'Toole, Gerstein, Murray & Borun

[57] ABSTRACT

An electric motor of the type used to power submersible pumps is disclosed. An interior cavity of the motor is filled with one or more liquids for cooling and/or lubricating the motor interior. A system for circulating the fill liquid within the motor cavity comprising a rotatable cup spacer attached to the motor shaft and liquid passageways is described.

9 Claims, 2 Drawing Sheets

SELF-LUBRICATING SUBMERSIBLE ELECTRIC MOTOR

BACKGROUND OF THE INVENTION

The present invention relates generally to submersible electrical motors used in liquid pumping applications. More particularly, the invention relates to improvements designed to both reduce the build-up of heat within a submersible electric motor while it is in operation, and to provide lubrication to the motor's moving parts.

Because they are adapted to fit within a narrow well bore, submersible electric motors which are used to power pumps for removing water and other liquids from underground wells normally have a relatively long length and small, cross-sectional diameter. The main body of such motors is typically formed from a tubular metal shell or casing. A rotatable drive shaft is mounted along the motor's central vertical axis; a coupling end of the drive shaft extends from the top of the motor assembly to provide motive power to a centrifugal pump mounted directly above the motor. In its operative environment, the composite pump and motor assembly lies beneath the surface of the liquid in a well. A motor of this type is disclosed in U.S. Pat. No. 3,777,194.

The motor of the present invention is of the pre-filled type, i.e., a motor where a sealed cavity in the interior of the motor containing the stator and rotor is filed with a liquid or fill solution such as mineral oil. When electric power is supplied to the stator windings of an electric motor, flow of current through the stator windings and rotor will generate heat. In combination with the motor casing, this liquid fill solution functions as a heat transfer medium to prevent excessive heat build-up within the motor interior while electrical power is applied to the motor. The liquid can also function as a lubricant for the bearing assemblies used to mount the drive shaft of the electric motor. Because both heat and friction can shorten the life of a motor, movement of the liquid fill solution within the motor cavity is desirable to aid in heat dissipation and motor lubrication.

The radial side load on the bearing adjacent to the coupling end of the motor drive shaft is generally higher than the radial load experienced by the lower end bearing. Therefore, the supply of sufficient lubricating fluid fill solution to the coupling end, i.e., the top end bearing of a submersible motor of the pre-filled type, is very critical.

As the interior of an electric motor heats up during operation, thermal expansion of the liquid fill in the oil-filled motor can occur. Some fill solution can leak out of the motor casing into the well fluid, typically around the motor's top seals where the spine or coupling end of the motor shaft extends from the top of the motor casing for connection with a pump. This leakage can eventually result in the loss of liquid fill in the upper regions of the motor, particularly in the area around the bearing assembly adjacent the upper portion of the motor drive shaft. The consequent loss of lubrication in this area may result in motor failure.

Accordingly, there is a need for a useful means to provide enhanced lubrication to the top end bearing in the types of submersible motors disclosed herein.

SUMMARY OF THE INVENTION

The present invention provides apparatus for enhancing the circulation of a liquid fill solution within the interior cavity of an electric motor while the motor is in operation. Movement of the liquid fill solution permits better transfer of heat from the motor interior to the surrounding liquid medium in which it is immersed (e.g., water) through the tubular motor shell. This movement also provides a flow of liquid across the mechanical parts of the motor while it is in operation, thus providing a lubricating effect to bearing assemblies and the like.

Movement of liquid within the motor cavity is enhanced by the rotation of a cup spacer which is secured to a top end of the motor drive shaft, and at least partially submerged beneath the surface of the liquid fill solution. The cup spacer can be formed of metal or a rigid plastic material. The base of the cup spacer is mounted around the motor drive shaft, above the rotor assembly. The side wall of the spacer extends upwardly and outwardly from this mounting point, terminating in an open top end. When the drive shaft is rotating, rotation of the cup spacer in the liquid fill medium exerts a pumping effect on the liquid, drawing it in an upward direction, across the upper bearing assembly.

A liquid passageway along the drive shaft facilitates circulation of the liquid within the motor cavity while the shaft is rotating. The liquid passageway can be a channel in the drive shaft, grooves along the outside of the drive shaft, discontinuities along the surface of the rotor attached to the drive shaft, channels along the stator surface, or combinations of these elements.

In a preferred embodiment of the invention, the fill solution in the motor cavity comprises two or more mutually insoluble liquids having different densities and different fluid viscosities. Preferably the liquid in the upper part of the cavity has a viscosity which is high enough to impart a lubricating film around the upper bearing assembly used to hold the motor shaft, preferably a viscosity in the range of 38 to 430 SUS (Saybolt Universal Seconds) or 4 to 81 cP at 40° C. The upper liquid should also have a relatively low liquid density, preferably in the range of 0.77 to 0.96 g/cc, so that it will float on top on the liquid material in the lower part of the cavity. An organic material, such as a medium viscosity mineral oil, is an ideal material. Suitable low-density mineral oils manufactured by PENRECO under the trade names Drakeol 5, Drakeol 6, Drakeol 13, Drakeol 35 are especially suitable.

In the mixed-fill embodiment, the lower fill fluid comprises a liquid which has a fairly low viscosity, but a density higher than that of the upper fill material. High viscosity materials are undesirable for the lower fill material because they produce higher drag on the rotating shaft-rotor assembly (so-called "windage friction") while the motor is operating. Water is a suitable material for the lower fill liquid, it also exhibits good heat-transfer characteristics. However, mixed-fill systems comprising two or more fill solution liquids could also be employed.

Further advantages of the invention will be apparent to those skilled in the art from a review of the following detailed description taken in conjunction with the drawings and the appended claims.

DETAILED DESCRIPTION OF THE INVENTION

Figure 1:
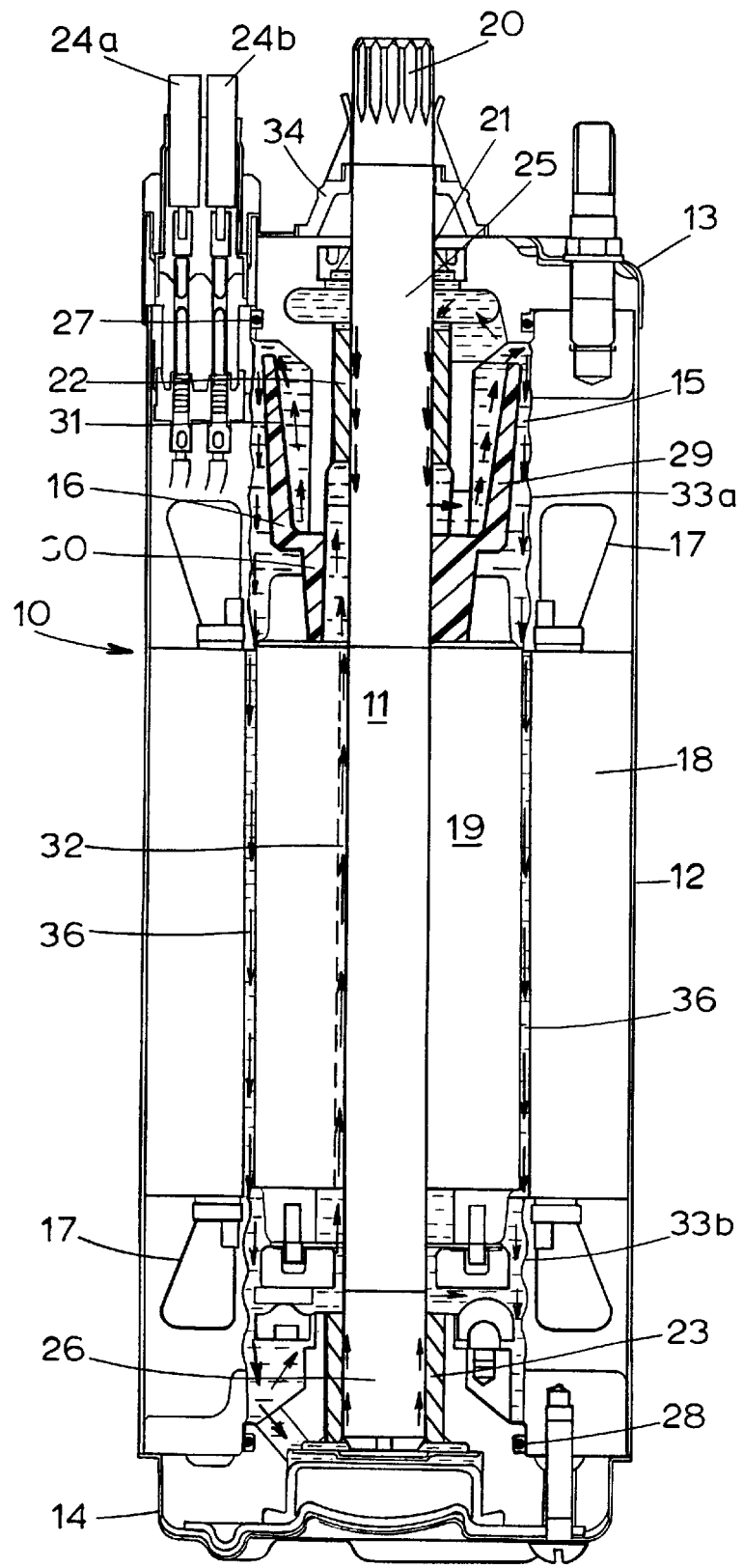
FIG. 1 is a longitudinal sectional view of a submersible electric motor in accordance with the present invention.
Figure 2:
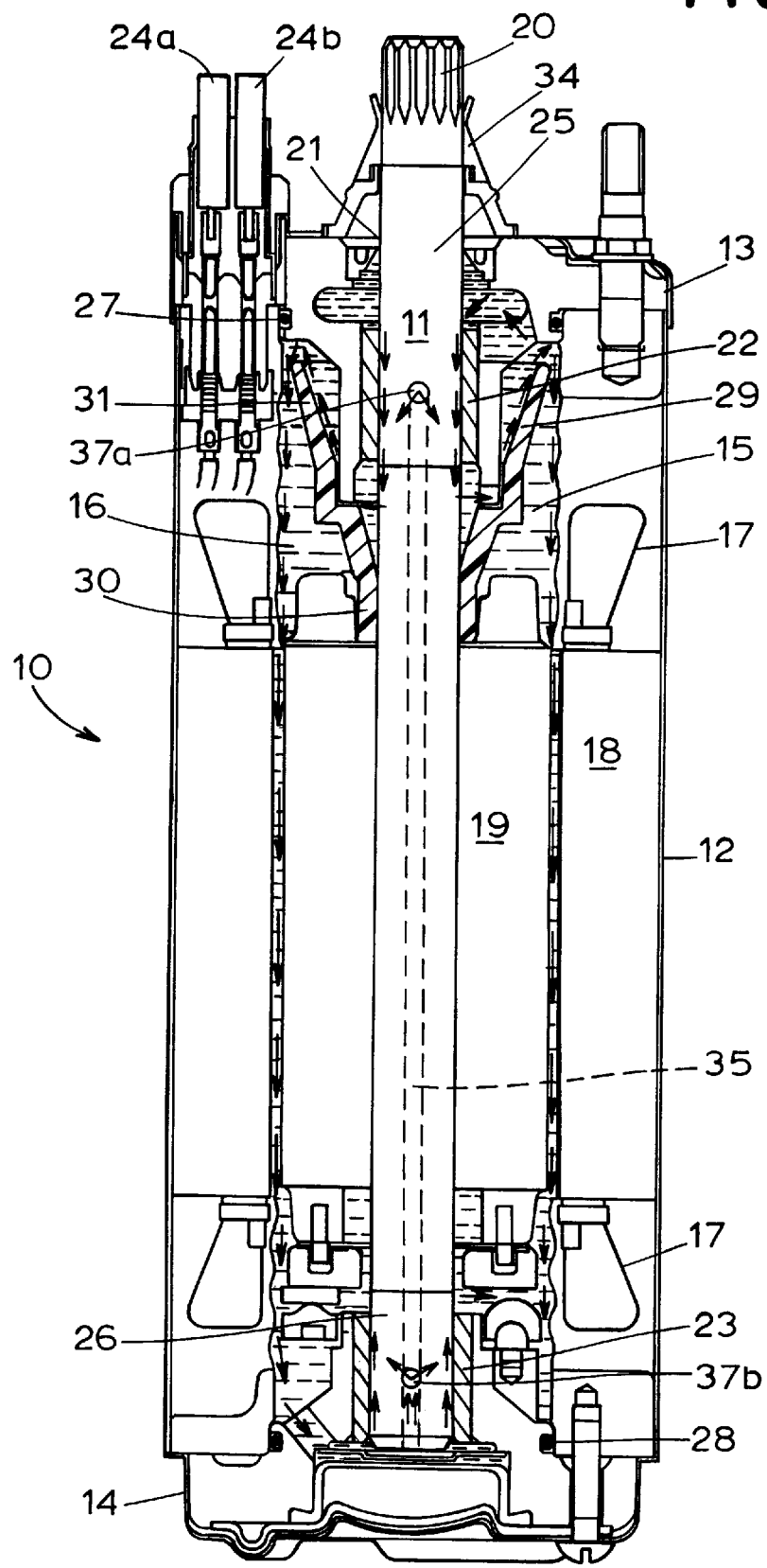
FIG. 2 is a longitudinal sectional view of a second embodiment of the submersible electric motor of the present invention.

FIGS. 1 & 2 depict an electric motor 10 having a vertically-mounted rotatable drive shaft 11 extending along the central axis thereof. A top end bell 13 and a bottom end bell 14 are attached to a tubular outer motor shell 12 to define a motor cavity 15 within electric motor 10. Motor cavity 15 contains a fill liquid 16. Upper and lower seals 27, 28 are provided to make cavity 15 fluid-tight so that fill liquid 16 does not migrate out of motor 10.

Motor 10 contains a laminated stator core 18, which is fixedly mounted to motor shell 12, and a laminated rotor core 19, which is attached to drive shaft 11. Stator core 18 is connected to a source of electrical power (not shown) by means of electrical connectors 24a, 24b at the top of the motor assembly. Stator wire loops or end turns 17 extend from the ends of laminated stator core 18. As described above, flow of electricity through the windings of stator core 18 and rotor 19 will generate heat within the motor.

Drive shaft 11 has upper and lower portions 25, 26 which are journaled, respectively, within upper and lower bearing assemblies 22, 23 mounted in motor cavity 15. A spine end 20 of drive shaft 11 extends vertically upward from motor shell 12 through a central aperture 21 of top end bell 13 and through a sand seal 34 for connection to a centrifugal pump (not shown). When power is supplied to motor 10 via connectors 24a, 24b, rotor core 19 and attached drive shaft 11 will rotate.

Movement of fill liquid 16 within motor cavity 15 is facilitated by a cup spacer 29 mounted below upper bearing assembly 22. Cup spacer 29, formed of a rigid plastic material, has a base segment 30 which is secured to drive shaft 11, and an upwardly-extending open top segment 31. Spacer 29 rotates with shaft 11, through fill liquid 16, producing a pumping action on liquid 16 causing the liquid to circulate within cavity 15, and across the upper bearing assembly 22.

Referring now to FIG. 1, circulation of fill liquid 16 within motor cavity 15 is accomplished by moving the liquid through liquid passageways (indicated generally by arrows) within cavity 15. A longitudinally-extending, vertical circulation slot 32 which is formed along laminated rotor core 19 functions as part of the liquid passageway system in the embodiment of FIG. 1, as does a gap 36 between stator core 18 and rotor core 19. Slot 32 forms a liquid pathway which is generally parallel to drive shaft 11. In embodiments where rotor core 19 has a skew, the arrangement of slot 32 would exhibit a similar degree of skew. Upper and lower lining portions 33a, 33b of laminated stator core 18 are rippled to provide a turbulent effect as liquid 16 moves across these surfaces. As a result, when drive shaft 11 rotates, fill liquid 16 is circulated within motor cavity 15 and across upper bearing assembly 22.

FIG. 2 illustrates another embodiment of an electric motor 10 having features for facilitating the circulation of fluid within motor cavity 15. In this embodiment, drive shaft 11 has a vertically-extending, central, gun-drilled channel 35 which extends along a portion of the axis of shaft 11. Gun-drilled channel 35 is in fluid communication with upper and lower transverse, cross-drilled channels 37a, 37b in shaft 11, thereby providing a liquid passageway for fill liquid 16 in response to the pumping action of rotating cup spacer 29. In other respects, the embodiment of FIG. 2 is similar to that shown in FIG. 1.

In an alternative embodiment (not shown) a gun-drilled channel extends to the base of drive shaft 11, and lower, transverse cross-drilled channel 37b is not required. Other arrangements for providing liquid passageways for the movement of fill liquid within the motor cavity will be apparent to those skilled in the art.

What is claimed:

1. A liquid-filled electric motor having a rotatable drive shaft disposed along the motor's central vertical axis, said motor comprising:

(a) a tubular outer motor shell;
    (b) top and bottom end bells interconnected to said motor shell, adjacent the top and bottom ends thereof, said end bells and said shell defining a cavity within the electric motor;
    (c) bearing assemblies in said motor, a first bearing assembly mounted within the motor cavity and supporting an upper portion of said drive shaft, and a second bearing assembly mounted above said bottom end bell and supporting a lower portion of said drive shaft;
    (d) a stator core fixedly mounted within said motor cavity;
    (e) a rotor core attached to said drive shaft between said first and second bearing assemblies;
    (f) a liquid fill solution in said motor cavity, said liquid fill solution in contact with said stator core and said rotor core;
    (g) a cup spacer in said motor cavity and in contact with said fill solution, said spacer comprising:
        i) a cup base segment mounted to the motor drive shaft, adjacent said first bearing assembly, and
        ii) an open cup top segment extending upwardly from said base segment, wherein rotation of said cup spacer in said liquid fill solution exerts a pumping action on said fill solution and causes said solution to flow across said first bearing assembly; and
    (h) a vertically-extending liquid passageway within said motor for movement of said fill solution within the motor cavity while said drive shaft is rotating.

2. The motor of claim 1 wherein said vertically-extending liquid passageway comprises:

a central channel extending along a portion of the axis of said drive shaft; and
    transverse channel intersecting with said central channel.

3. The motor of claim 1 further including a rotor in said motor cavity, said rotor attached to and rotatable with said drive shaft, wherein said vertically-extending liquid passageway comprises a generally longitudinal slot in said rotor.

4. The motor of claim 1 wherein said liquid fill solution in the motor cavity comprises two liquids having different fluid densities and different fluid viscosities, the lower-density liquid occupying the upper portion of said motor cavity and the higher-density liquid occupying the lower portion of said motor cavity when said motor is off.

5. The motor of claim 4 wherein the liquid in the upper portion of said motor cavity has a viscosity sufficient to impart a lubricating film to said first bearing assembly.

6. The motor of claim 4 wherein the liquid in the upper portion of said motor cavity has a liquid density in the range of about 0.77 to 0.96 g/cc.

7. The motor of claim 4 wherein the liquid in the upper portion of said motor cavity comprises mineral oil.

8. The motor of claim 4 wherein the liquid in the lower portion of said motor cavity comprises water.

9. The motor of claim 4 wherein the liquid in the upper portion of said motor cavity has a viscosity between 38 and 430 SUS.

* * * * *